United States Patent
Cheng et al.

(10) Patent No.: US 7,273,803 B2
(45) Date of Patent: Sep. 25, 2007

(54) BALL LIMITING METALLURGY, INTERCONNECTION STRUCTURE INCLUDING THE SAME, AND METHOD OF FORMING AN INTERCONNECTION STRUCTURE

(75) Inventors: Yu-Ting Cheng, HsinChu (TW); Stefanie Ruth Chiras, Peekskill, NY (US); Donald W. Henderson, Ithaca, NY (US); Sung-Kwon Kang, Chappaqua, NY (US); Stephen James Kilpatrick, Olney, MD (US); Henry A. Nye, III, Brookfield, CT (US); Carlos J. Sambucetti, Vallejo, CA (US); Da-Yuan Shih, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 10/724,938

(22) Filed: Dec. 1, 2003

(65) Prior Publication Data
US 2005/0118437 A1    Jun. 2, 2005

(51) Int. Cl.
*H01L 21/44* (2006.01)

(52) U.S. Cl. .................................................... 438/612
(58) Field of Classification Search ........ 257/734–738, 257/779, E23.04; 438/106, 612–613
See application file for complete search history.

(56) References Cited

U.S. PATENT DOCUMENTS

| | | | |
|---|---|---|---|
| 6,730,982 B2 * | 5/2004 | Barth et al. .................. | 257/529 |
| 2002/0123220 A1 * | 9/2002 | Sambucetti et al. ......... | 438/678 |
| 2002/0142592 A1 * | 10/2002 | Barth et al. .................. | 438/687 |
| 2003/0127743 A1 * | 7/2003 | Brintzinger ................... | 257/762 |
| 2003/0219966 A1 * | 11/2003 | Jin et al. ...................... | 438/612 |
| 2004/0178503 A1 * | 9/2004 | Jin et al. ...................... | 257/737 |
| 2005/0062169 A1 * | 3/2005 | Dubin et al. ................. | 257/779 |

\* cited by examiner

*Primary Examiner*—Nathan W. Ha
(74) *Attorney, Agent, or Firm*—F. Chau & Associates, LLC

(57) ABSTRACT

A ball-limiting metallurgy includes a substrate, a barrier layer formed over the substrate, an adhesion layer formed over the barrier layer, a first solderable layer formed over the adhesion layer, a diffusion barrier layer formed over the adhesion layer, and a second solderable layer formed over the diffusion barrier layer.

14 Claims, 5 Drawing Sheets

BALL LIMITING METALLURGY, INTERCONNECTION STRUCTURE INCLUDING THE SAME, AND METHOD OF FORMING AN INTERCONNECTION STRUCTURE

BACKGROUND

1. Technical Field

The present disclosure relates to interconnection structures for flip-chip attachment of microelectronic device chips to packages.

2. Description of the Related Art

Three different interconnection technologies are employed to provide interconnection between a chip and a substrate (or chip carrier). These interconnection technologies are tape automated bonding (TAB), wirebonding, and area array. The area array is often call a flip-chip connection or C4 (controlled-collapse chip connection). The C4 technology uses solder bumps deposited on a solder-wettable layered structure known as a ball-limiting metallurgy (BLM) on the chip. Since the C4 technology uses an array of solder bumps that can be placed over the entire surface area of the chip, it can achieve a higher density of input/output interconnections and better power dissipation than can wirebonding or TAB, which confine the interconnections to the chip periphery.

A number of systems have been proposed and evaluated for fabrication of C4s using lead-free metallurgies. Lead-free solders, such as tin-based alloys, are now commonly used to avoid the harmful environmental effects of lead-based alloys. During the fabrication process of a BLM, a "plated through the mask" process is employed in which metallurgies, such as TiW/Cr/phased Cr/Cu/Ni/Pb-free alloy, are sequentially deposited During hot storage, in which wafers are kept at 120-150° C. for over 1000 hours, voids form in the copper layer. These voids are apparently due to Ni—Cu/Sn intermetallics, which are in turn formed by Ni/Cu interdiffusion produced by long term thermal exposure. These voids lead to failure in the integrity of the BLM structure and are a reliability concern.

SUMMARY OF THE INVENTION

A ball-limiting metallurgy according to an embodiment of the invention includes a substrate, a barrier layer formed over the substrate, an adhesion layer formed over the barrier layer, a first solderable layer formed over the adhesion layer, a diffusion barrier layer formed over the adhesion layer, and a second solderable layer formed over the diffusion barrier layer.

An interconnection structure for flip-chip attachment of microelectronic device chips to packages according to an embodiment of the invention includes a ball-limiting metallurgy and at least one lead-free solder ball formed over the ball-limiting metallurgy. The ball limiting metallurgy includes a barrier layer formed over the microelectronic device chip, an adhesion layer formed over the barrier layer, a first solderable layer formed over the adhesion layer, a diffusion barrier layer formed over the adhesion layer, and a second solderable layer formed over the diffusion barrier layer.

A method for forming an interconnection structure for flip-chip attachment of microelectronic device chips to packages includes forming a barrier layer over a substrate, forming an adhesion layer over the barrier layer, and forming a resist layer over the adhesion layer, the resist layer having an opening that exposes the adhesion layer. A first solderable layer is formed over the adhesion layer through the opening in the resist layer. A diffusion barrier layer is formed over the first solderable layer through the opening in the resist layer. A second solderable layer is formed over the diffusion barrier layer through the opening in the resist layer. The resist layer is removed, and portions of the barrier layer and the adhesion layer that extend beyond the first solderable layer, the diffusion barrier layer and the second solderable layer are also removed. At least one solder ball is formed over the second solderable layer.

In at least one embodiment of the invention, the diffusion barrier layer is made of CoWP.

These and features of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DESCRIPTION OF PREFERRED EMBODIMENTS

Figure 1:
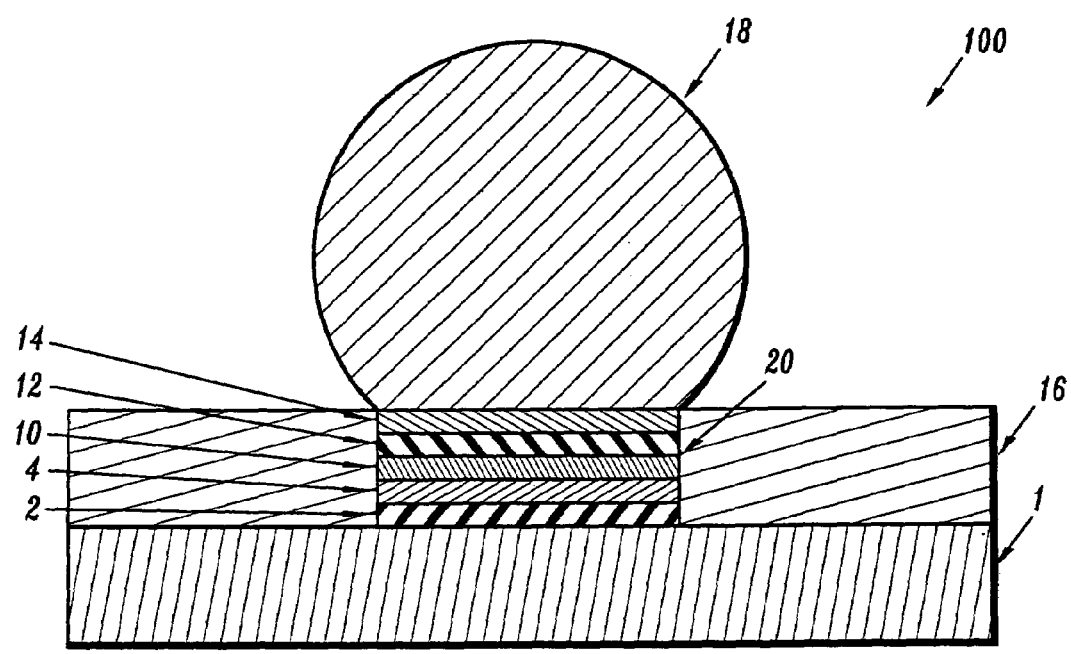
FIG. 1 is a cross sectional view of an interconnection structure according to an embodiment of the invention.

FIG. 1 is a cross sectional view of an interconnection structure according to an embodiment of the invention. The interconnection structure 100 includes a substrate 1, and a polyimide layer 16 having an opening 20 formed over the substrate 1. A barrier layer 2, an adhesion layer 4, a first solderable layer 10, a diffusion barrier layer 12, and a second solderable layer 14 are sequentially formed in the opening 20 of the polyimide layer 16. A lead-free solder 18 is formed over the second solderable layer 14. In exemplary embodiments of the invention, the first solderable layer 10 is made of Cu, the second solderable layer 14 is made of Ni and the diffusion barrier layer 12 is made of CoWP. CoWP does not substantially change the conductivity of Cu, has excellent adhesion to Cu and dielectrics, and acts as a barrier to prevent the diffusion of Cu. The CoWP diffusion barrier layer 12 has been experimentally shown to be an almost perfect barrier to the diffusion of Cu atoms into a Ni second solderable layer, thereby preventing the generation of voids in the Cu.

Figure 2:
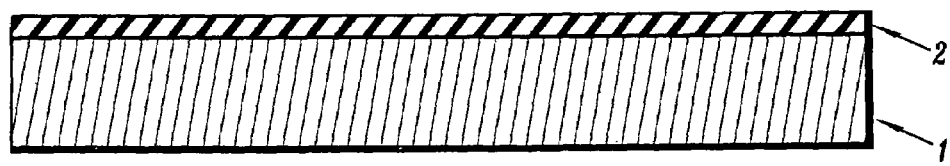
FIGS. 2-12 are cross sectional views showing various steps of a method of forming an interconnection structure according to an embodiment of the invention.

FIGS. 2-12 are cross sectional views showing various steps of a method of forming an interconnection structure according an embodiment of the invention. As shown in FIG. 2, a barrier layer 2 is blanket deposited over a silicon substrate 1, such as, for example, an SOI, GaAs, or SiGe substrate. The barrier layer 2 can be made of any suitable material, such as, for example, TiW or Cr, and can be deposited by, for example, sputtering.

Figure 3:
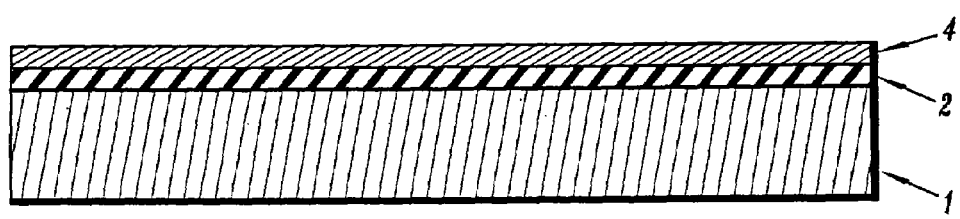

As shown in FIG. 3, an adhesion layer 4 is blanket deposited over the barrier layer 2. The adhesion layer 4 can be made of any suitable material, such as, for example, phased CrCu and can be formed by sputtering.

Figure 4:
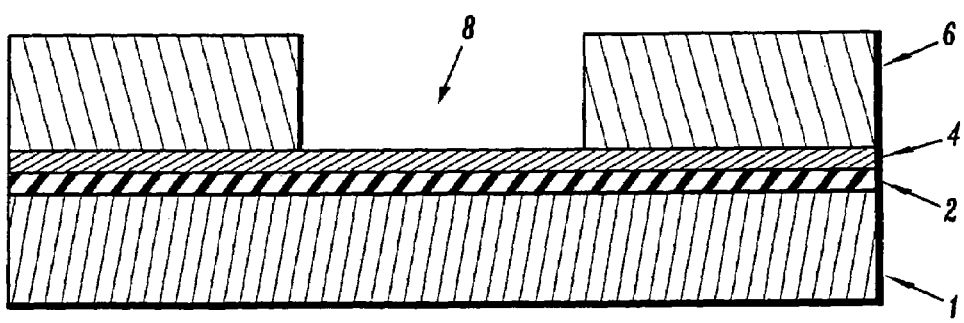

As shown in FIG. 4, a photoresist pattern 6 is formed over the adhesion layer 4. The photoresist pattern 6 includes an opening 8 in which a C-4 is to be formed.

Figure 5:
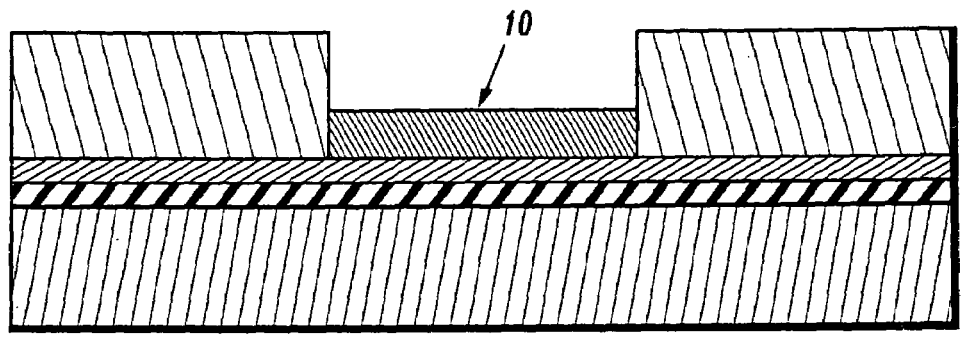

As shown in FIG. 5, a first solderable layer 10 is formed over the adhesion layer 4 through the opening 8 of the photoresist pattern 6. The first solderable layer 10 is preferably made of electroplated Cu and is formed to a thickness of about 1 to 2 microns.

Figure 6:
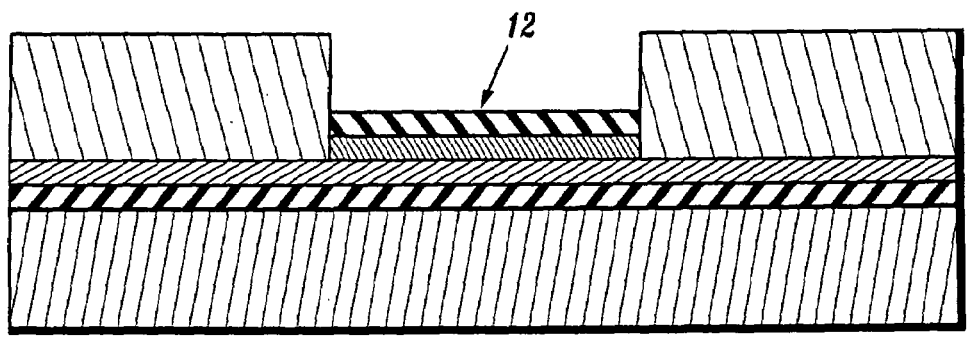

As shown in FIG. 6, a diffusion barrier layer 12 is formed over the first solderable layer 10. The diffusion barrier layer 12 is preferably formed by electroless deposition to a thickness of about 500 to about 1500 angstroms. The diffusion barrier layer 12 is preferably made of CoWP. In an embodiment of the invention in which the diffusion barrier layer is made of CoWP, the electroless deposition process includes immersion of the wafer in a dilute Pd solution containing 0.05 g/l $PdSO_4$, made in 0.5 M $H_2SO_4$. Immersion of the wafer in the Pd solution results in deposition of a monolayer of Pd particles over the copper first solderable layer 10 by the following chemical reaction:

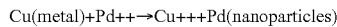

Cu(metal)+Pd++→Cu+++Pd(nanoparticles)

After the monolayer of Pd particles is deposited over the first solderable layer 10, the wafer is immersed in a COWP electroless plating bath. In an embodiment of the invention, the electroless plating bath is made up of 6 g/l $CoSO_4$, 2-4 g/l ammonium tungstate, complexed in 40 g/l sodium citrate, 25 g/l boric acid, and 8 g/l Na hypophosphite. The solution is kept at about 75-80° C. with a pH of about 9. The plating bath has a plating rate of about 100 A/min, thus depositing a 100 A CoWP layer over the copper first solderable layer 10 in about 10 minutes. The wafer is thoroughly rinsed in distilled water after being immersed in the plating bath.

Figure 7:
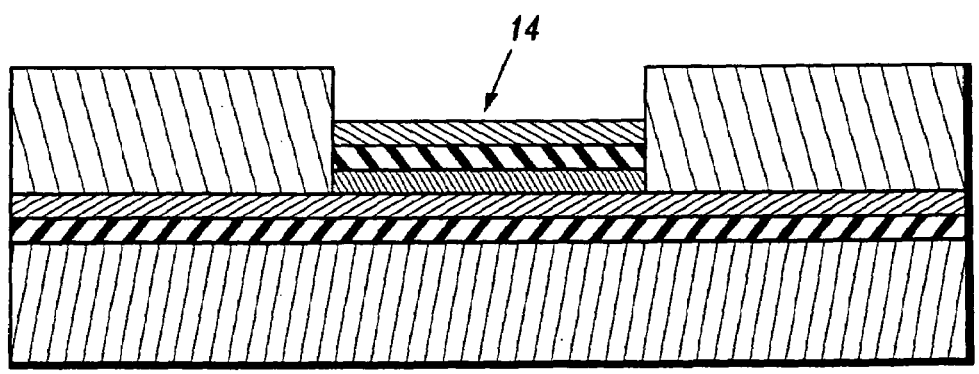

As shown in FIG. 7, a second solderable layer 14 is formed over the diffusion barrier layer 12. The second solderable layer 14 is made of any suitable material, such as, for example, nickel, cobalt, iron and alloys of these metals, such as NiFe, CoFe, NiCo or NiCoFe. The second solderable layer 14 is preferably formed by electroplating to a depth of about 2 to 4 microns.

Figure 8:
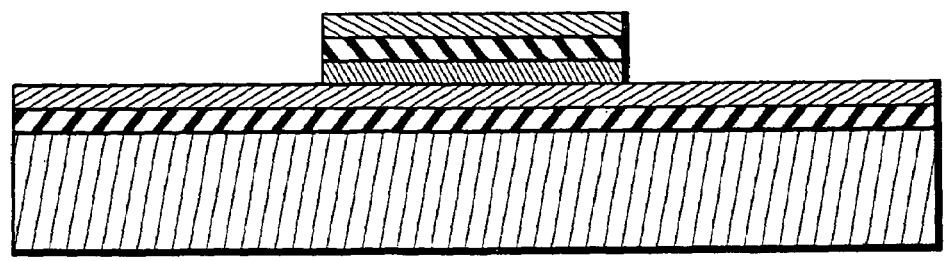
Figure 9:
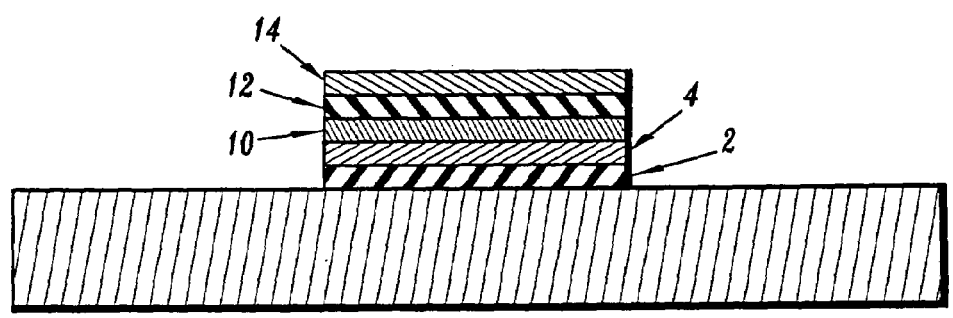

As shown in FIG. 8, the resist 6 is removed. Portions of the barrier layer 2 and the adhesion layer 4 that remain around the C-4 structures are also removed, resulting in the structure shown in FIG. 9. The portions of the barrier layer 2 and the adhesion layer 4 can be removed by any suitable process, such as, for example, etching or ion milling.

Figure 10:
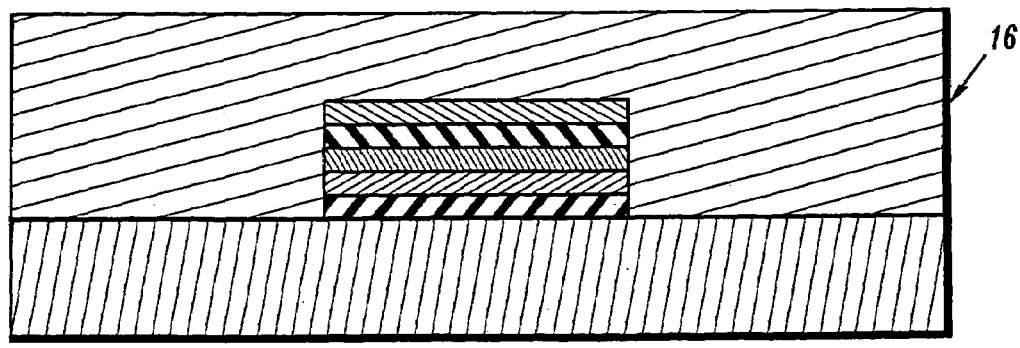
Figure 11:
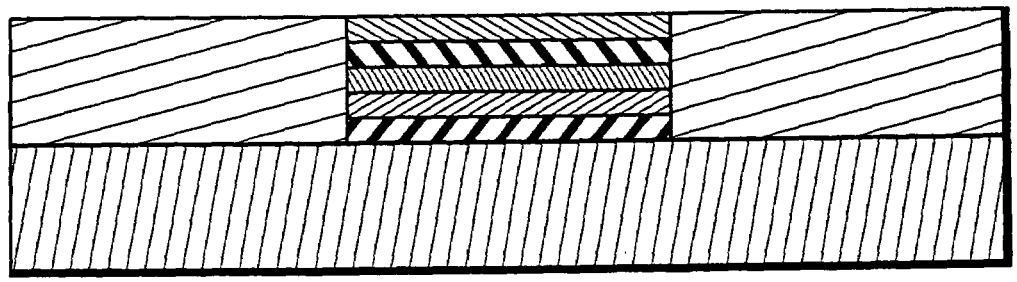

As shown in FIG. 10, a polyimide layer 16 is formed over the second solderable layer 14 and the substrate 1. The polyimide layer 16 is subjected to an etching process, such as reactive ion etching, until the second solderable layer 14 is exposed, resulting in the structure shown in FIG. 11.

Figure 12:
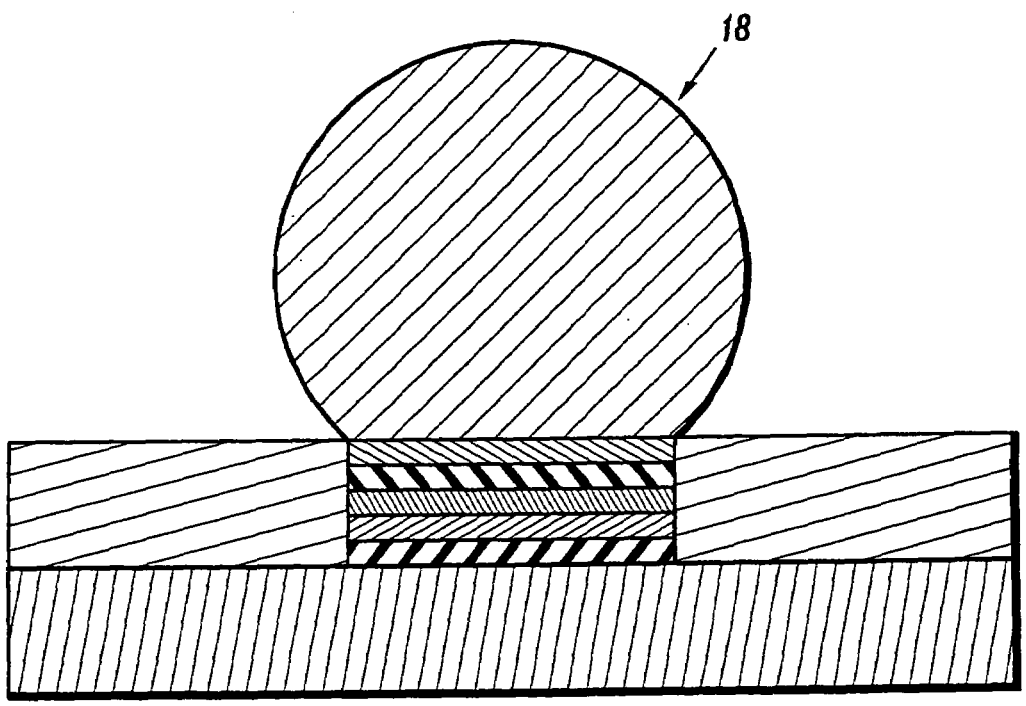

As shown in FIG. 12, a lead-free solder 18 is formed over the second solderable layer 14. The lead-free solder 18 can be made of any suitable material, such as, for example, tin alloys. The lead-free solder 18 can be formed by any suitable process, such as, for example, electroplating, solder screening, or injection molded solder (IMS) techniques. Alternatively, solders that are not easily deposited as alloys may be produced by a sequence of steps. Any series of electroplating, exchange plating, or electroless deposition steps may be used to deposit the solder components in the correct proportion, and the solder components are later alloyed during a reflow step. For example, if a Cu—Sn alloy is used as the lead-free solder 18, the plating of Sn and Cu can be carried out sequentially in individual Sn plating solutions and Cu plating solutions, followed by a final reflow.

Although the illustrative embodiments have been described herein with reference to the accompanying drawings, it is to be understood that the present invention and method are not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for forming an interconnection structure for flip-chip attachment of microelectronic device clips to packages, comprising:

forming an adhesion layer over a substrate;

forming a seed layer over the adhesion layer, forming a resist layer over the seed layer, the resist layer having an opening that exposes the seed layer;

forming a first solderable layer over the seed layer through the opening in the resist layer, wherein the first solderable layer comprises Cu;

forming a diffusion barrier layer over the first solderable layer through the opening in the resist layer, wherein the diffusion barrier layer comprises CoWP;

forming a second solderable layer over the diffusion barrier layer through the opening in the resist layer, wherein the second solderable layer comprises a layer of Ni having a thickness less than about 4 microns;

removing the resist layer;

removing portions of the seed layer and the adhesion layer that extend beyond the first solderable layer, the diffusion barrier layer and the second solderable layer; and forming at least one solder ball over the second solderable layer.

2. The method of claim 1, further comprising forming a polyimide layer around the adhesion layer, the seed layer, the first solderable layer, the diffusion barrier layer and the second solderable layer.

3. The method of claim 1. wherein the adhesion layer is formed by sputtering.

4. The method of claim 1, wherein the seed layer is formed by sputtering.

5. The method of claim 1, wherein the first solderable layer is formed by electroplating.

6. The method of claim 1, wherein the diffusion barrier layer is formed by electroless deposition.

7. The method of claim 1. wherein, the second solderable layer is formed by electroplating.

8. The method of claim 1, wherein the solder ball comprises a Led-free solder ball formed by electroplating, solder screening, exchange plating, or molten solder injection deposition.

9. A method for forming an interconnection structure for flip-chip attachment of microelectronic device chips to packages, comprising:

forming an adhesion layer over a substrate;

forming a seed layer over the adhesion layer, forming a first solderable layer over the seed layer, wherein the first solderable layer comprises Cu;

forming a diffusion barrier layer over the first solderable layer, wherein the diffusion barrier layer comprises CoWP;

forming a second solderable layer over the diffusion barrier layer, wherein the second solderable layer comprises a layer of Ni having a thickness less than about 4 microns; and forming at least one solder ball over the second solderable layer.

10. The method of claim 9, wherein the step of forming the first solderable layer comprises:
  forming a resist layer over the seed layer, the resist layer having an opening that exposes the seed layer; and
  electroplating the first solderable layer over the seed layer through the opening in the resist layer.

11. The method of claim 10, wherein the step of forming the diffusion barrier layer comprises electroless deposition of the diffusion barrier layer over the first solderable layer through the opening in the resist layer.

12. The method of claim 11, wherein the step of forming the second solderable layer comprises electroplating the second solderable layer over the diffusion barrier layer through the opening in the resist layer.

13. The method of claim 11, further comprising
  removing the resist layer after the first solderable layer, the diffusion barrier layer and the second solderable layer are formed; and
  removing portions of the barrier layer and the adhesion layer that extend beyond the first solderable layer, the diffusion barrier layer and the second solderable layer after the resist layer is removed.

14. The method of claim 9, further comprising forming a polyimide layer around the barrier layer, the adhesion layer, the first solderable layer, the diffusion barrier layer and the second solderable layer.

* * * * *